United States Patent [19]

Gartner

[11] Patent Number: 5,200,482

[45] Date of Patent: Apr. 6, 1993

[54] PROCESS FOR THE PRODUCTION OF HIGH MOLECULAR WEIGHT COPOLYMERS OF DIALLYL AMMONIUM MONOMERS AND ACRYLAMIDE MONOMERS IN SOLUTION

[75] Inventor: Herbert A. Gartner, Baden-Baden, Fed. Rep. of Germany

[73] Assignee: The Dow Chemical Company, Midland, Mich.

[21] Appl. No.: 814,175

[22] Filed: Dec. 30, 1991

Related U.S. Application Data

[62] Division of Ser. No. 667,707, Mar. 11, 1991, Pat. No. 5,110,883.

[51] Int. Cl.$^5$ .............................................. C08F 236/20
[52] U.S. Cl. ................................. 526/295; 526/307.3; 526/304; 526/310
[58] Field of Search ................ 526/295, 307.3, 310, 526/304

[56] References Cited

U.S. PATENT DOCUMENTS

| | | | |
|---|---|---|---|
| 2,923,701 | 2/1960 | Schuller et al. | 526/291 |
| 3,147,218 | 9/1964 | Booth et al. | 526/291 |
| 3,585,148 | 6/1971 | Sackis | 252/344 |
| 3,920,599 | 11/1975 | Hurlock et al. | 524/801 |
| 4,070,930 | 3/1978 | Lim et al. | 30/90.6 |
| 4,152,200 | 5/1979 | Coscia et al. | 162/168.3 |
| 4,439,580 | 3/1984 | Schaper | 524/801 |

FOREIGN PATENT DOCUMENTS

| | | |
|---|---|---|
| 103698 | 3/1984 | European Pat. Off. |
| 188721 | 7/1986 | European Pat. Off. |
| 247774 | 12/1987 | European Pat. Off. |
| 127729 | 10/1977 | German Democratic Rep. |

OTHER PUBLICATIONS

C. Wandrey and W. Jaeger (1985) Acta Polym. 36(2), 100–102 "Copolymerization of dimethyl diallyl ammonium chloride and acryl amide".

W. Jaeger et al. (1984) J. Macromol. Sci.—Chem. A21(5), 593–614 "Cyclopolymerization Kinetics of dimethyl diallyl ammonium chloride".

H. Tanaka (1986) J. Polym. Sci. Polym. Chem. Ed. 24, 29–36 "Copolymerization of Cationic Monomers with acetylamido in Aqueous Solution".

*Primary Examiner*—Joseph L. Schofer
*Assistant Examiner*—M. Nagumo

[57] ABSTRACT

Water-soluble, high molecular weight, linear copolymers of a diallyl ammonium monomer and an acrylamide monomer of various cationicities are prepared by copolymerization of a major portion of the acrylamide monomer via stage-addition in a solvent solution and adding a chain transfer agent at the conclusion of said copolymerization to prevent branching and cross-linking from occurring.

16 Claims, No Drawings

PROCESS FOR THE PRODUCTION OF HIGH MOLECULAR WEIGHT COPOLYMERS OF DIALLYL AMMONIUM MONOMERS AND ACRYLAMIDE MONOMERS IN SOLUTION

CROSS-REFERENCE TO RELATED APPLICATION

This is a divisional of application Ser. No. 07/667 707, filed Mar. 11, 1991, now U.S. Pat. No. 5,110,883.

This invention relates to high molecular weight, water soluble, linear copolymers of diallyl ammonium monomers and acrylamide monomers having varying cationicities, and to methods of preparing the same. Copolymers of this type are useful as cationic flocculants in the treatment of industrial water, as sludge conditioners for the treatment of municipal water systems, and as drainage and retention aids in the manufacture of paper.

Diallyl ammonium monomers are quaternary monomers, which when polymerized, yield water soluble polymers that are cationic in nature. The polymerization of acrylamide monomers, on the other hand, produces water soluble polymers that are essentially non-ionic in nature. Thus, the copolymerization of diallyl ammonium monomers and acrylamide monomers results in the formation of water soluble copolymers having various degrees of cationicity, depending upon the amount of diallyl ammonium monomer that is incorporated into the final copolymer.

The copolymerization of diallyl ammonium monomers and acrylamide monomers in solution is well known. U.S. Pat. No. 2,923,701, for example, describes the simultaneous copolymerization of acrylamide and diallyl dimethyl ammonium chloride in solution by the addition of a redox catalyst, such as ammonium persulfate and potassium metabisulfite, to an aqueous mixture of the monomers.

U.S. Pat. No. 3,147,218 discloses the use of diallyl ammonium monomers and acrylamide monomers based copolymers for the separation of mineral fines. European Patent Application 103 698 describes the preparation of acrylamide and diallyl ammonium monomer based copolymers via the polymerization of a solution of the corresponding monomers in the presence of a free radical initiator. The solvent is removed by polymerizing and drying the resulting polymer solution at a temperature above the boiling point of the solvent.

Copolymers of diallyl ammonium monomers and acrylamide monomers can also be obtained utilizing emulsion polymerization techniques in accordance with the teachings of U.S. Pat. No. 3,920,599. Stable water-in-oil copolymer emulsions are prepared, which can then be inverted by means of suitable hydrophilic, water-soluble surfactants. U.S. Pat. No. 4,070,930 discloses the preparation of stable emulsion copolymers of diallyl ammonium monomers and acrylamide, which can be inverted by the addition of water. European Patent Application 0 188 721 provides an improved process for the incorporation of diallyl ammonium monomer into an acrylamide monomer based polymer by means of either emulsion or solution polymerization techniques. This improvement comprises the step of polymerizing diallyl ammonium monomers and acrylamide monomers in the presence of a copolymerizable monomer, such as a quaternary substituted acrylamide or methacrylamide. The monomer utilized must have a greater reactivity than a diallyl ammonium monomer with an acrylamide monomer.

The present invention relates to a process for the preparation of high molecular weight, water-soluble, linear copolymers of diallyl ammonium monomers and acrylamide monomers having a uniform diallyl ammonium monomer to acrylamide monomer ratio. More particularly this process comprises the steps of:

a) initiating the copolymerization of a stirred mixture of diallyl ammonium monomer with a portion of the total amount of the acrylamide monomer required in a solvent solution at a temperature at which copolymerization proceeds;

b) adding to said stirred monomer solution the remaining acrylamide monomer via continuous stage addition, preferably over a period of from about 0.5 to about 8 hours at a temperature at which copolymerization proceeds;

c) homogeneously mixing a chain transfer agent in said gel solution to form a gel mixture;

d) heating said gel mixture to minimize residual monomer content, preferably to a temperature of from about 60° to about 90° C. for a period of from about 0.1 to about 4 hours;

e) drying said gel mixture, and recovering the desired copolymer therefrom.

This invention also relates to high molecular weight water soluble linear copolymers of diallyl ammonium monomers and acrylamide monomers prepared in accordance with the process of this invention. Such copolymers are particularly useful as flocculants for sludge conditioning in the treatment of municipal and industrial water and waste water systems over a wide range of pH. The copolymers described herein are also useful as drainage and retention aids in the manufacture of paper.

As previously indicated, the preparation of diallyl ammonium monomer and acrylamide monomer based copolymers is well known. In general, however, the existing prior art copolymers are non-uniform in their composition and tend to be highly branched and crosslinked. In addition, the prior art copolymers are of relatively low molecular weight, and/or have intrinsic viscosities generally less than 6 dl/g.

The present invention overcomes these deficiencies of the prior art and enables the preparation of high molecular weight copolymers from diallyl ammonium monomers and acrylamide monomers having intrinsic viscosities ranging from 10 to 25 dl/g. More particularly, diallyl ammonium monomer and acrylamide monomer based copolymers are prepared in accordance with this invention that have intrinsic viscosities ranging from 15 to 20 dl/g. It is generally recognized by those skilled in the art that intrinsic viscosity is an indication of polymer molecular weight. Thus, the higher the intrinsic viscosity, the greater is the molecular weight of the particular polymer or copolymer prepared.

When prepared in accordance with the teachings of this invention, copolymers of varying cationicities can be prepared. Moreover, such copolymers are uniform in composition. That is to say, copolymers are prepared which contain little, if any, residual monomer, and which have a uniform diallyl ammonium monomer to acrylamide monomer ratio throughout the entire length of the copolymer chain.

One difficulty in the preparation of diallyl ammonium monomer and acrylamide monomer based copolymers, have a uniform distribution throughout the length of the copolymer chain, is due to the difference in reactivity of the acrylamide monomer as compared to the diallyl ammonium monomer. This difference in reactivity results in a non-uniform distribution of the diallyl ammonium monomer throughout the copolymer chain. Thus, at the onset of the copolymerization reaction, a relatively larger number of acrylamide monomer units are initially incorporated into the polymer chain due to the greater reactivity of the acrylamide monomer. Accordingly, at the conclusion of the copolymerization reaction, relatively more of the diallyl ammonium monomer units remain unused and remain either as free monomer, or form low molecular weight homopolymers. These excess diallyl ammonium monomers or low molecular weight diallyl ammonium homopolymers remain either as a residual mixture or they become incorporated within the copolymer chain, which results in a non-uniform distribution of copolymer units throughout the copolymer chain. This is particularly true in the case of copolymers wherein the final diallyl ammonium content is greater than 20% on a molar basis of the total copolymer content.

A further difficulty in the preparation of high molecular weight linear copolymers of diallyl ammonium monomers and acrylamide monomers is due to the manner in which the diallyl ammonium monomers polymerize. Normally, the diallyl ammonium monomers polymerize by incorporating both of the allyl bonds within the same molecule to form a linear polymer chain. A small proportion of the diallyl ammonium monomer, however, can polymerize via the incorporation of only one of its allyl bonds, thereby leaving a pendant double bond remaining in the molecule. These pendant double bonds can subsequently initiate branching, particularly at higher temperatures, to produce cross-linked polymers that have a reduced solubility in water, see Jaeger et al., *Journal of Macromolecular Science*, Part A Chemistry, 593–614, (1984).

This greater reactivity of the acrylamide monomer in combination with the tendency of the diallyl ammonium monomer to polymerize via branching or cross-linking, results in the formation of non-linear diallyl ammonium monomer and acrylamide monomer based copolymers having relatively low intrinsic viscosities, and which are not particularly well suited as flocculants in water and waste water system for sludge conditioning, or as drainage and retention aids in the manufacture of paper. These problems have been overcome by means of the present invention, which enables the preparation of high molecular weight, linear copolymers of diallyl ammonium and acrylamide monomers of uniform composition that have little, if any, branching and cross-linking in the polymer chain.

The diallyl quaternary ammonium compounds preferably correspond to the formula

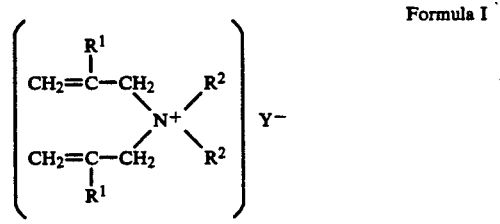

Formula I wherein $R^1$ is independently in each occurrence is hydrogen or $C_{1-4}$ alkyl; $R^2$ is independently in each occurrence $C_{1-18}$ alkyl, $C_{1-18}$ alkoxyalkyl or $C_{1-18}$ hydroxyalkyl moieties; and Y is an anion, which does not sustantially interfere with the polymerization reaction.

Illustrative examples of radicals represented by $R^2$ in Formula 1 are methyl to octadecyl, inclusive; hydroxymethyl and the various hydroxyethyl to hydroxyoctadecyl, inclusive; and methoxymethyl and the various high alkoxy (e.g., methoxy to octadecocy, inclusive) alkyls, e.g., ethyl to octadecyl inclusive. Illustrative examples of anions represented by Y in Formula I are the halide ions (that is, Y can represent halogen, more particularly chlorine, bromine, fluorine or iodine), sulfate, sulfonate, phosphate, hydroxide, borate, carbonate, thiosulfate, isocyanate, oxalate, silicate, sulfide, cyanate, acetate and the other common inorganic and organic ions. Specific examples of compounds embraced by Formula I are the diallyl, dimethallyl, diallyl dimethyl and diethallyl dimethyl, di (beta-hydroxyethyl) and di(beta-ethoxyethyl) ammonium chlorides, bromides, phosphates and sulfates. Other examples will be apparent to those skilled in the art from Formula I and from the numerous examples of anions represented by Y and of radicals represented by $R^2$ that have been given hereinbefore with reference to the said formula.

$R^1$ is preferably hydrogen, methyl or ethyl; methyl or even more preferably hydrogen or methyl; and most preferably hydrogen. Y is preferably a halide ion, and most preferably a chloride ion. In a most preferred embodiment the diallyl quaternary ammonium compound is diallyl dimethyl ammonium compound; the most preferred diallyl dimethyl ammonium compound is diallyl dimethyl ammonium chloride (DADMAC).

Acrylamide compounds as used herein refers to acrylamide, methacrylamide, and derivatives thereof wherein the alpha carbon may be substituted with a $C_{1-5}$ lower alkyl moiety and the amide nitrogen may be substituted with a $C_{1-18}$ alkyl moiety, $C_{1-18}$ alkyloxy moiety or $C_{1-18}$ hydroxy alkyl moieties. Such acrylamide compounds preferably correspond to the formula

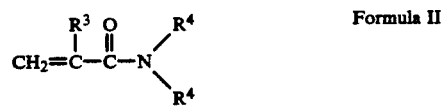

Formula II wherein $R^3$ is independently in each occurrence hydrogen, or a $C_{1-5}$ lower alkyl moiety;

$R^4$ is independently in each occurrence hydrogen $C_{1-18}$ alkyl, $C_{1-18}$ alkoxy, or $C_{1-18}$ hydroxy substituted alkyl. $R^3$ is preferably hydrogen or methyl, and most preferably hydrogen. $R^4$ is preferably hydrogen or $C_{1-18}$ alkyl; more preferably hydrogen or $C_{1-8}$ lower alkyl, and most preferably hydrogen or methyl.

In general, the process of this invention essentially utilizes a controlled addition or stage-addition of the acrylamide monomer during the copolymerization reaction. Surprisingly, it has been discovered that this continuous stage-addition of the acrylamide monomer produces high molecular weight copolymers of diallyl ammonium and acrylamide monomers which heretofore have not, as yet, been available. Additionally, copolymers having high diallyl ammonium monomer conversions can be prepared that contain a uniform distribution of diallyl ammonium monomer and acrylamide monomer units throughout the entire length of the copolymer chain with little, if any, residual diallyl ammonium monomer or acrylamide monomer remaining in the finished product. In addition, the process of this invention also utilizes the addition of a chain transfer agent to prevent branching and cross-linking of the polymer chain from occurring, particularly at elevated temperatures.

The impurities in the starting monomers can affect the overall properties of the final polymer. The starting monomers should be sufficiently pure to prepare linear copolymers with relatively constant diallyl ammonium monomer to acrylamide monomer ratios along the chain and which has an intrinsic viscosity of from about 10 to 25 d/l. In a preferred embodiment, wherein the diallyl ammonium monomer is DADMAC and the acrylamide monomer is acrylamide, DADMAC has no more than about 50 ppm of allyldimethylamine; about 100 ppm of dimethylamine, and about 10 ppm of allyl alcohol. Preferably, the acrylamide has no more than 1200 ppm of nitrilotrispropionamide, and 10 ppm of methoxyhydroquinone.

To initiate copolymerization, a portion of the acrylamide monomer is added to the total amount of diallyl ammonium monomer that is requires. Preferably, about 12 to about 20% of the total amount of the acrylamide monomer is initially added to the reaction mixture. More preferably, from about 15 to about 17% of the total amount of the acrylamide monomer required is generally added to initiate copolymerization. The copolymerization reaction of the diallyl ammonium monomers and the acrylamide monomers is an exothermic reaction. Thus, once copolymerization begins, the temperature of the reaction mixture rapidly increases. At this point the remaining amount of acrylamide monomer is introduced to the reaction mixture via a process of stage-addition. After all of the acrylamide monomer has been stage-added to the reaction mixture, a chain transfer agent is added in order to prevent any branching or cross-linking of the polymer chain from occurring.

The copolymerization reaction is conducted in solution in the presence of a suitable solvent. A suitable solvent is a solvent which dissolves the reactants and which does not deleteriously affect the final properties of the copolymer produced. Preferable solvents include water, primary alcohols having from 1 to 4 carbon atoms, and aqueous mixtures thereof. The use of lower alcohols has the advantage that it can provide a granular product that is easier to handle and that can be more readily dried. However, inasmuch as both the starting materials and final products are soluble in water, water is generally the solvent of choice.

Sufficient solvent should be employed to facilitate polymerization and to homogeneously dissolve all of the components of the reaction mixture. Aqueous monomer solutions containing from about 40 to about 70% of monomer are preferably employed as starting solutions. Preferably, aqueous monomer solutions containing from about 50 to about 60% monomer are generally employed. If necessary, additional water can be added to the reaction mixture during the course of the reaction in order to provide optimum conditions for polymerization and adequate mixing.

One important aspect of this invention is that copolymers of varying cationicities can be precisely prepared in accordance with the process of this invention. The greater the number of diallyl ammonium monomer units introduced into the polymer chain, the greater will be the cationicity of the resulting copolymer. Thus, copolymers useful as cationic flocculants in water clarification systems or as sewage dewatering agents, require copolymers having a higher degree of cationicity than cationic flocculants useful as drainage and/or retention aids in the manufacture of paper. The copolymer contemplated by the present invention range from about 5 to about 95 mole % cationicity. That is to say, in a copolymer consisting of 100 monomer units, the copolymers described herein comprise from about 5 to about 95 diallyl ammonium monomer units, and conversely from about 95 to about 5 acrylamide monomer units. Preferably, copolymers comprising from about 5 to about 75 mole % cationicity can be prepared. Still more preferably, polymers having from about 10 to about 50 mole % cationicity can be prepared in accordance with the teachings of this invention.

The period of time during which stage addition occurs is dependent upon the amount of diallyl ammonium monomer units that are to be introduced into the polymer chain. Thus to prepare a copolymer having a 10 mole % cationicity stage addition of about one hour is preferably used, whereas to prepare a copolymer having 30 mole % cationicity stage addition of about 3 hours is preferably used. To prepare copolymers having up to 90 mole % cationicity stage addition of about 8 hours is preferably used. These periods of time will, of course, vary slightly depending upon the type and design of reactor employed, the degree of mixing and the temperature at which the copolymerization is conducted. For large scale preparations, the particular parameters to be employed can be optimized via standard procedures known to those skilled in the art.

Preferably, the stage-added acrylamide monomer solution is continuously introduced in such a manner that a slightly decreasing feed rate is achieved throughout the total period of stage addition. Thus, for example, in a more preferred embodiment during the first quarter of the period for stage addition, from about 30 to about 35% of the remaining acrylamide monomer solution is stage-added; during the second quarter of the stage-addition period, about 25 to about 30% of the acrylamide monomer solution is stage-added; during the third quarter about 20 to about 25% of the monomer solution is stage-added; and the final from about 15 to about 20% of the acrylamide monomer solution is introduced during the final quarter of the stage addition period. For the production of large quantities of copolymers, a metering pump can be advantageously employed.

The copolymerization reaction is generally initiated using free radical polymerization techniques known to those skilled in the art. Compounds which form mainly water soluble radicals are suitable as polymerization initiators. For example, azostarters such as 2,2-azobis-(N,N'-dimethylene-isobutyramidine) dihydrochloride, 2,2'-azobis-(2-amidinopropane) dihydrochloride, 2,2'-azobis-(N,N'dimethyleneisobutyramidine), 4,4'-azobis-(4-cyanopentane-carboxylic acid), 2,2'-azobis(4-methoxy-2,4-dimethylvaleronitrile), 2,2'-azobis(2,4-dimethylvaleronitrile), (1-Phenylethyl)azodiphenylmethane, 2,2'-azobisisobutyronitrile, dimethyl 2,2'-azobisisobutyrate, and 2,2'-azobis-(2-methyl-butyronitrile) can be employed.

Additionally, peroxide polymerization initiators can be employed, as for example, dibenzoyl peroxide, dilauryl peroxide, di-2-ethylhexylperoxydicarbonate, dicyclohexylperoxydicarbonate, bis-(4-tert. butylcyclohexyl)peroxydicarbonate, tert. butylperpivalate, tert. butylperbenzoate, tert. butylpermaleinate, di-tert. butylperoxide, tert.-butylhydroperoxide, hydrogen peroxide, ammonium persulfate, potassium persulfate, sodium persulfate, and redox catalysts in combination with reducing agents such as iron(II)-ammonium sulfate, ascorbic acid, sodium methyl sulfinate, disodium disulfite and sodium hydrogen sulfite can be employed. These initiators can be used either alone or in combination with one another.

The rate of decomposition of the more readily decomposed peroxides can be reduced by the addition of organic metal complex compounds, as for example, copper acetyl acetonate. Thus the rate of peroxide decomposition can be adapted, for example, to the particular polymerization temperature selected. Preferred redox catalysts are those selected from one or several peroxides in combination with a reducing agent. Especially preferred are persulfates or peresters or mixtures of persulfates and peresters as a component of the redox polymerization initiators. The polymerization initiators are preferably used in amounts ranging from about 0.001 to about 5% by weight, and more preferably from about 0.02 to about 2% by weight, in relation to the amount of monomers utilized.

It is preferable to keep the reaction mixture well mixed and in intimate contact with the stage-added acrylamide monomer throughout the entire stage-addition process, in order to obtain a homogeneous distribution of diallyl ammonium monomer throughout the copolymer chain. Insufficient mixing results in a nonhomogeneous polymerization, whereas too rapid or too intensive mixing results in polymer degradation. Adequate mixing of the copolymerization mixture is of particular importance in the latter stages of the copolymerization due to the gel which forms.

The degree and amount of mixing required to homogeneously blend the reaction mixture varies widely depending upon the size and the shape of the particular apparatus employed. Reaction mixers used in the preparation of gels or other similar materials, that provide intimate mixing and kneading via a shearing action, are particularly well suited to this process. During the latter stages of polymerization a gel solution forms which becomes progressively more and more viscous. This gel solution may require additional water as well as additional mixing time in order to obtain a homogeneous reaction mixture.

The preferred temperature at which polymerization occurs, and is thus initiated, ranges from about 20° to about 50° C. More preferably, polymerization is initiated and conducted at a temperature ranging from about 30° to about 40° C. Still more preferably a temperature of 35° C. is employed. Copolymers of diallyl ammonium monomers and acrylamide monomers prepared at a temperature of 35° C. are completely soluble in water, irregardless of how large their molecular weights are. On the other hand, copolymers prepared at temperatures above 40° C. tend to be insoluble or partially insoluble. This insolubility is the result of the increased tendency for the diallyl ammonium monomer to polymerize via branching and cross-linking at higher temperatures. The more branched and cross-linked the copolymers become, the less soluble they are in water. Indeed, one of the qualitative tests for the degree of branching and cross-linking for this type of copolymer is its solubility in water.

Inasmuch as the polymerization reaction is exothermic in nature, control of the reaction temperature is important. In order to maintain close control over the reaction temperature, the boiling point of the particular reaction solvent mixture is utilized. Thus, where water is employed as the reaction solvent, the reaction is conducted under a reduced pressure ranging from about 35 to about 60 millibars, preferably from about 50 to about 55 millibars pressure, in order to maintain a constant temperature of 35°±1.0° C. Following the stage addition of all of the acrylamide monomer solution, the reaction mixture is stirred for an additional period of from about 30 minutes to about 1 hour at a the polymerization temperature in order to complete polymerization. Preferably, polymerization occurs at temperatures of from about 20° to about 50° C. More preferably, polymerization is conducted at a temperature ranging from about 30° to about 40° C., and most preferably about 35° C.

After the completion of the polymerization reaction, the reaction vessel is brought to atmospheric pressure utilizing nitrogen or some other inert gas. A polymerization reaction regulator or chain transfer agent is added to the gel solution with mixing in order to prevent branching and cross-linking from occurring. Preferable chain transfer agents include, for example, lower alkyl alcohols having from 1 to 5 carbon atoms, mercaptoethanol, mercaptopropanol, thioglycolic acid, dodecylmercaptan, formic acid, halogenated hydrocarbons, such as bromoethane or carbon tetrachloride, and sodium hypophosphite. More preferably, a solution of sodium hypophosphite is employed. The chain transfer agents are preferably used in amounts ranging from 0 to about 3% by weight with respect to the monomers employed and must be thoroughly mixed with the gel mixture.

Following the addition of the chain transfer agent, the reaction mixture is heated to a temperature at which residual monomer undergoes polymerization, preferably about 60° to about 90° C. and more preferably about 75° C. and maintained at that temperature for a period sufficient to polymerize most of the residual monomer remaining, preferably for a time of from about 0.1 to about 4.0 hours. This period of heating serves to minimize the residual monomer content of the copolymer produced. This is especially important with respect to any residual acrylamide monomer that may be present, so that copolymers are prepared that are environmentally compatible.

The gel mixture containing the desired product is cooled, discharged from the reactor and dried. Alternatively, prior to drying, the gel mixture can be extruded and granulated in order to assist the final drying step. The product so prepared can be dried using any well known means for drying, as for example, a fluidized bed, a circulating air conveyer, vacuum drying or microwave drying. The dried product is obtained as a white, granular, pourable material, which is completely soluble in water, and which preferably has an intrinsic viscosity, as determined by viscosity measurements in a 4% sodium chloride solution, ranging from about 10 to about 25 dl/g.

The following methods can be used to qualitatively and quantitatively determine the degree of diallyl ammonium monomer incorporation into the final copolymer.

(1) Solubility in Methanol

Copolymers of DADMAC and acrylamide having a DADMAC content greater than 30 mole % are soluble in methanol. Copolymers in the range of 30 mole % are soluble in methanol, if, in addition, the methanol contains 10-20% water. Copolymers of low DADMAC content, as well as the homopolymers of acrylamide are totally insoluble in methanol or mixtures of 80% methanol and 20% water. The fact that the 50 mole % copolymer of Example 4 and the 30 mole % copolymer of Example 3 are soluble in methanol and a 15 methanol-water mixture (80% /20%), respectively, demonstrates that no homopolyacrylamides or copolymers of low DADMAC content are present in these copolymers.

(2) Colloidal Titration Using Potassium Polyvinyl Sulfate

Using the method described by W Schempp et al., *Papier*, 36 (10A), 41-6 (1982), the cationicity of the various copolymers produced can be determined. This procedure provides a method for determining the cationic charges bound to the particular polymer tested as expressed in eq/kg. Comparison with the theoretical calculated values, enables the calculation of the degree of diallyl ammonium monomer conversion.

The copolymers produced in accordance with this invention are used as aids in the dewatering of a wide variety of aqueous suspensions. These copolymers are particularly useful in the dewatering of organic sludge suspensions that are proteinaceous in nature or the dewatering of suspensions that have been obtained by the biological degradation of such matter. Such suspensions can be derived from raw or processed sewage, food waste, and fermentation effluents. The copolymers of this invention are also useful in the clarification of various types of industrial waste waters.

It is frequently desirable to dewater such sludges or suspensions in order to facilitate their removal and their disposal. Dewatering can be effected by the addition of an appropriate amount of the copolymer as a flocculating agent prior to the physical removal of water. Dewatering of sludges or suspensions is usually effected by the addition of an aqueous solution of the polymer having a concentration ranging from about 0.01 to about 1% by weight of polymer. Preferably from about 0.05% to about 0.5% of copolymer solution is employed. Typical addition rates for sewage sludge are in the range from about 0.2 to about 1.0% of polymer per total weight of sewage solids.

The copolymers of this invention are also useful in the paper industry as drainage and retention aids in the manufacture of paper, and in the dewatering of aqueous effluents containing cellulosic fibers. Such uses include, for example, treating aqueous waste water from a paper mill prior to discharge of the effluent, or treating return process water for the papermaking process. Such water may contain suspensions of cellulose or other finely divided particles in concentrations ranging from about 50 ppm to about 1 or 2% by weight of solution. The copolymers of this invention are particularly useful and are generally employed as solutions of about 0.01 to about 1%. However, it is sometimes more convenient to prepare stock solutions of about 1 to about 2%, from which the copolymers can be utilized.

The invention described and claimed herein is more particularly illustrated in conjunction with the following examples, which are not intended to limit the invention in any way.

EXAMPLE 1

To 2.89 kg of a 60% aqueous solution of DADMAC is added 2.11 kg of a 50% aqueous solution of acrylamide, 3.31 kg of water, 27 g of a 40% aqueous solution of the pentasodium salt of diethylenetriaminepentaacetic acid, 2 g of 2,2-azobis(N,N'dimethyleneisobutyramidine) dihydrochloride, 5 g of 2,2'-azobis(2-amidinopropane) dihydrochloride, and 27 g of sodium persulfate in a 30 liter horizontal reaction vessel equipped with a mixing shaft, heating jacket, vacuum control, reflux condenser and inlet ports for stage addition. The reaction mixture is deoxygenated by repeatedly evacuating the system and purging it with nitrogen. This process is repeated two additional times to insure complete deoxygenation.

The reaction mixture is heated with stirring to initiate polymerization. Once polymerization begins, the reaction is evacuated to 50-55 millibars in order to maintain a close temperature control of the exothermic reaction. As soon as an increase in temperature is observed, the remaining 11.62 kg of a 50% aqueous solution of acrylamide, and an additional 3.0 g of 2,2'-azobis (N,N'-dimethyleneisobutyramidine) dihydrochloride in water is added over a period of one hour, via stage-addition, with constant stirring. The feed rate is adjusted so that approximately 29% of the acrylamide solution is added during the first quarter of the total time period, 26% is added during the second quarter, 24% during the third quarter, and the remaining 21% of the acrylamide solution is added during the last quarter of the total time period of one hour.

After all of the acrylamide monomer solution has been stage-added, the reaction mixture is stirred for an additional 40 minutes while maintaining the reaction temperature at 35° C. The reaction vessel is brought to atmospheric pressure with nitrogen and 0.5 kg of a 10% aqueous sodium hypophosphite solution is added to the gel solution over a 30 minute period, taking care to mix the sodium hypophosphite solution carefully into the gel mixture. The temperature of the reaction mixture is raised to 75° C. and maintained for a period of 2 hours to effectively reduce any residual monomer that remains.

The gel mixture is discharged into a simple granulator and dried in a fluid bed drier at 90° C. for 50 minutes to produce a dry, white granular copolymer comprising 10 mole % cationicity and having a uniform distribution throughout the polymer chain. This copolymer has an intrinsic viscosity of 16 dl/g when measured in 4% sodium chloride solution at 25° C. using a Brookfield LVT with a UL adapter. The actual cationicity as determined by potassium polyvinyl sulfate titration shows a cationicity of 1.24 eq/kg as compared to a theoretical cationicity of 1.25 eq/kg (99% DADMAC conversion). The copolymer is soluble in water and insoluble in methanol.

EXAMPLES 2-4

Following essentially the same procedure as in Example 1, but making the equivalent substitutions shown below, copolymers of varying cationicities are obtained. All weights are expressed in kg.

| Example | 2 | 3 | 4 |
|---|---|---|---|
| Initial DADMAC charge (60% solution) | 4.33 | 7.57 | 11.57 |
| Initial Acrylamide charge (50% solution) | 1.87 | 1.56 | 1.08 |
| Water | 3.60 | 3.05 | 1.98 |
| Pentasodium salt of diethylenetriamine-pentacetic acid (40% solution) | 0.023 | 0.023 | 0.022 |

-continued

| Example | 2 | 3 | 4 |
|---|---|---|---|
| 2,2'azobis(2-amidine-propane)dihydrochloride | 0.005 | 0.005 | 0.005 |
| Sodium persulfate | 0.027 | 0.027 | 0.027 |
| 2,2'azobis(N,N'-dimethylene-isobutyramidine) dihydrochloride | 0.002 | 0.002 | 0.002 |
| Stage additon-50% acrylamide solution | 10.13 | 7.75 | 5.30 |
| Stage additon-2,2'-azo-bis-(N,N'-dimethylene-isobutyramidine) dihydrochloride | 0.003 | 0.003 | 0.003 |
| Sodium hypophosphite (10% solution) | 0.5 | 0.5 | 0.5 |
| Reaction Temperature (°C.) | 35 | 35 | 35 |
| Stage Addition (hrs) | 2 | 3 | 4 |
| pH of reaction mixture | 7 | 7 | 7 |

The copolymers of DADMAC and acrylamide so obtained have the following properties:

| Example | 2 | 3 | 4 |
|---|---|---|---|
| Cationicity (mole %) | 16 | 30 | 50 |
| Cationic Titration (eq/kg) | | | |
| Theoretical | 1.87 | 2.6 | 4.3 |
| Actual | 1.73 | 2.6 | 3.8 |
| DADMAC Conversion (%) | 92.5 | 85 | 89.3 |
| *Intrinsic Viscosity (dl/g) | 12.8 | 12.5 | 13.3 |
| Solubility Water | sol | sol | sol |
| Solubility Methanol | insol | **insol | sol |

*4% NaCl at 25° C.
**Sol 80% methanol/20% water

COMPARATIVE EXAMPLES 5-8

Following essentially the same procedures described in Examples 1-4, but without the stage adding of the acrylamide monomer, copolymers having the following properties were obtained.

| Example | 5 | 6 | 7 | 8 |
|---|---|---|---|---|
| Cationicity (mole %) | 10 | 16 | 30 | 50 |
| Cationic Titration (eq/kg) | | | | |
| Theoretical | 1.25 | 1.87 | 3.05 | 4.3 |
| Actual | 0.40 | 0.67 | 1.37 | 2.09 |
| DADMAC Conversion (%) | 32 | 36.1 | 45 | 48.7 |

As evidenced by the poor rates of DADMAC conversion and corresponding lack of cationicity, these non-uniform copolymers of DADMAC and acrylamide are unsuitable as flocculants for sludge conditioning in the treatment of municipal and industrial water waste systems.

EXAMPLE 9

Following essentially the same procedure described in Examples 1-4, but omitting the use of sodium hypophosphite as a chain transfer agent, cross-linked DADMAC and acrylamide copolymers are obtained which are insoluble in water. Such copolymers are not suitable for use as flocculating agents, due to their lack of solubility.

I claim:

1. A water-soluble, linear copolymer of diallyl ammonium monomer and an acrylamide monomer having a uniform diallyl ammonium monomer to acrylamide monomer ratio and an intrinsic viscosity of from about 10 to about 25 dl/g as determined in a 4% sodium chloride solution.

2. A copolymer as claimed in claim 1 wherein the diallyl ammonium monomer corresponds to the formula:

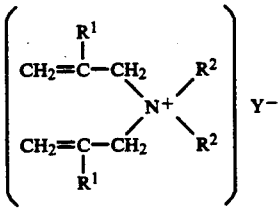

Formula I and the acrylamide monomer corresponds to the formula:

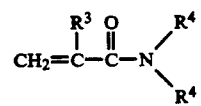

wherein $R^1$ is independently in each occurrence hydrogen or $C_{1-\alpha}$ alkyl; $R^2$ is independently in each occurrence hydrogen, a $C_{1-18}$ alkyl, $C_{1-18}$ alkoxyalkyl or $C_{1-18}$ hydroxyalkyl moiety; $R^3$ is independently in each occurrence hydrogen or a $C_{1-5}$ lower alkyl moiety; $R^4$ is independently in each occurrence hydrogen, $C_{1-18}$ alkyl, $C_{1-18}$ alkoxy alkyl, or $C_{1-18}$ hydroxyalkyl; and Y is an anion.

3. A copolymer as claimed in claim 2, wherein said intrinsic viscosity is from 15 to 20 dl/g.

4. A water-soluble, linear copolymer of a diallyl ammonium monomer and an acrylamide monomer having a uniform diallyl ammonium monomer to acrylamide monomer ratio prepared by the process comprising the steps of:
   a) initiating the copolymerization of a stirred mixture of diallyl ammonium monomer with a portion of the total amount of acrylamide monomer required in a solvent solution at a temperature at which copolymerization proceeds;
   b) adding to said stirred monomer solution the remaining acrylamide monomer by continuous addition to form a homogeneous gel solution, while maintaining the reaction temperature;
   c) after completion of the addition of acrylamide, maintaining the reaction mixture at the polymerization temperature for a period of about 30 minutes to about 1 hour to complete polymerization;
   d) after the polymerization is completed homogeneously mixing a chain transfer agent in said gel solution to form a gel mixture;
   e) heating said gel mixture to a temperature at which residual monomer undergoes copolymerization; and
   f) drying said gel mixture.

5. A copolymer prepared by the process according to claim 4 wherein the diallyl ammonium monomer corresponds to the formula:

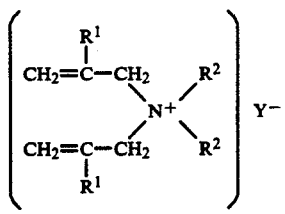

Formula I and the acrylamide monomer corresponds to the formula:

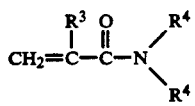

wherein $R^1$ is independently in each occurrence hydrogen or C1-4 alkyl; $R^2$ is independently in each occurrence hydrogen, a C1-18 alkyl, C1-18 alkoxyalkyl or C1-18 hydroxyalkyl moiety; $R^3$ is independently in each occurrence hydrogen or a C1-5 lower alkyl moiety; $R^4$ is independently in each occurrence hydrogen, C1-18 alkyl, C1-18 alkoxy alkyl, or C1-18 hydroxyalkyl; and Y is an anion.

6. A copolymer prepared by the process as claimed in claim 5, wherein the solvent is water or C1-C4 primary alcohol.

7. A copolymer prepared by the process as claimed in claim 6, wherein the polymerization temperature of steps a) b) and c) is about 20° to about 50° C.

8. A copolymer prepared by the process as claimed in claim 7, wherein about 15 to about 17 percent of the total amount of the acrylamide monomer is added to step (a).

9. A copolymer prepared by the process as claimed in claim 8, wherein the addition of the remaining acrylamide monomer in step (b) is over a period of about 0.5 to about 8 hours.

10. A copolymer prepared by the process as claimed in claim 9, wherein the remaining acrylamide monomer is added in such a manner that a decreasing feed rate is achieved over step b).

11. A copolymer prepared by the process as claimed in claim 10, wherein from about 30 to about 35% of the remaining acrylamide monomer is added during the first quarter of step b) period, from about 25 to about 30% is added during the second quarter, from about 20 to about 25% is added during the third quarter and from about 15 to about 20% is added during the final quarter.

12. A copolymer prepared by the process as claimed in claim 11, wherein the chain transfer agent is sodium hypophosphite.

13. A copolymer prepared by the process as claimed in claim 11, wherein the heating of step (e) is conducted at about 60° to about 90° C. for about 0.1 to about 4.0 hours.

14. A copolymer prepared by the process as claimed in claim 13, wherein the diallyl ammonium monomer to acrylamide monomer ratio is from about 5 to about 95 mole percent.

15. A copolymer prepared by the process as claimed in claim 13, wherein the diallyl ammonium monomer to acrylamide monomer ratio is from about 25 to about 50 mole percent.

16. A copolymer prepared according to the process as claimed in claim 10 wherein the polymerization temperature of steps a) b) and c) is about 40° C. or below.

* * * * *

UNITED STATES PATENT AND TRADEMARK OFFICE
CERTIFICATE OF CORRECTION

PATENT NO. : 5,200,482

DATED : April 6, 1993

INVENTOR(S) : Herbert A. Gartner

It is certified that error appears in the above-identified patent and that said Letters Patent is hereby corrected as shown below:

Cover page, Item [56]

H. Tanaka (1986) J. Polym. Sci. Polym. Chem. Ed. 24, 29-36 "Copolymerization of Cationic Monomers with "acetylamido" -- acrylamide -- in Aqueous Solution".

Column 12, line 28:

...wherein R1 is independently in each occurrence hydrogen or "$C_{1-\alpha}$" -- $C_{1-4}$ -- alkyl; R2 is independently in each occurrence hydrogen,
...

Signed and Sealed this

Sixteenth Day of August, 1994

Attest:

BRUCE LEHMAN

*Attesting Officer*   *Commissioner of Patents and Trademarks*